(12) United States Patent
Olson et al.

(10) Patent No.: US 11,314,396 B2
(45) Date of Patent: Apr. 26, 2022

(54) SELECTING A TEXT INPUT FIELD USING EYE GAZE

(71) Applicant: Apple Inc., Cupertino, CA (US)

(72) Inventors: Earl M. Olson, Santa Clara, CA (US); Pol Pla I. Conesa, Belmont, CA (US); Aaron P. Thompson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/052,081

(22) PCT Filed: Apr. 24, 2019

(86) PCT No.: PCT/US2019/028980
§ 371 (c)(1),
(2) Date: Oct. 30, 2020

(87) PCT Pub. No.: WO2019/217081
PCT Pub. Date: Nov. 14, 2019

(65) Prior Publication Data
US 2021/0240331 A1    Aug. 5, 2021

Related U.S. Application Data

(60) Provisional application No. 62/669,290, filed on May 9, 2018.

(51) Int. Cl.
*G06F 3/048* (2013.01)
*G06F 3/04842* (2022.01)
(Continued)

(52) U.S. Cl.
CPC .......... *G06F 3/04842* (2013.01); *G06F 3/013* (2013.01); *G06F 3/0487* (2013.01)

(58) Field of Classification Search
CPC .... G06F 3/04842; G06F 3/013; G06F 3/0487; G06F 3/048
See application file for complete search history.

(56) References Cited

U.S. PATENT DOCUMENTS

| 8,408,706 B2 | 4/2013 | Yahav |
| 10,248,399 B2 | 4/2019 | Yoon |

(Continued)

FOREIGN PATENT DOCUMENTS

| CN | 103460256 A | 12/2013 |
| CN | 104516497 A | 4/2015 |

(Continued)

OTHER PUBLICATIONS

Non-Final Office Action received for U.S. Appl. No. 16/828,857, dated Feb. 17, 2021, 12 pages.

(Continued)

*Primary Examiner* — Jeanette J Parker
(74) *Attorney, Agent, or Firm* — Dentons US LLP

(57) ABSTRACT

In an exemplary process for selecting a text input field using an eye gaze, a graphical object including the text input field is displayed. The text input field is associated with one or more respective locations on one or more displays. Characteristics of an eye gaze are determined using gaze sensors, and a gaze location is determined using the characteristics. Input is received from an input device corresponding to one or more text characters. If the gaze location corresponds to the one or more respective locations, then the one or more text characters are displayed in the text input field. If the gaze location does not correspond to the one or more respective locations, then the one or more text characters are not displayed in the text input field.

27 Claims, 10 Drawing Sheets

(51) Int. Cl.
*G06F 3/01* (2006.01)
*G06F 3/0487* (2013.01)

(56) References Cited

U.S. PATENT DOCUMENTS

| | | | |
|---|---|---|---|
| 10,353,532 B1 | 7/2019 | Holz et al. | |
| 2007/0162872 A1 | 7/2007 | Hong et al. | |
| 2008/0181452 A1 | 7/2008 | Kwon et al. | |
| 2008/0307360 A1 | 12/2008 | Chaudhri et al. | |
| 2012/0249416 A1 | 10/2012 | Maciocci et al. | |
| 2013/0042296 A1 | 2/2013 | Hastings et al. | |
| 2013/0050258 A1 | 2/2013 | Liu et al. | |
| 2013/0241805 A1 | 9/2013 | Gomez | |
| 2013/0283208 A1 | 10/2013 | Bychkov et al. | |
| 2013/0328762 A1 | 12/2013 | McCulloch et al. | |
| 2014/0160001 A1 | 6/2014 | Kinnebrew et al. | |
| 2014/0184550 A1* | 7/2014 | Hennessey | G06F 3/013 345/173 |
| 2014/0204002 A1 | 7/2014 | Bennet et al. | |
| 2015/0100803 A1 | 4/2015 | Chen et al. | |
| 2015/0130716 A1 | 5/2015 | Sridharan et al. | |
| 2015/0138079 A1 | 5/2015 | Lannsjø | |
| 2015/0205494 A1 | 7/2015 | Scott et al. | |
| 2015/0268821 A1 | 9/2015 | Ramsby et al. | |
| 2015/0293592 A1 | 10/2015 | Cheong et al. | |
| 2015/0317518 A1 | 11/2015 | Fujimaki et al. | |
| 2015/0317837 A1 | 11/2015 | Sholudko et al. | |
| 2015/0323990 A1 | 11/2015 | Maltz | |
| 2016/0018645 A1 | 1/2016 | Haddick et al. | |
| 2016/0018654 A1 | 1/2016 | Haddick et al. | |
| 2016/0026253 A1 | 1/2016 | Bradski et al. | |
| 2016/0116980 A1* | 4/2016 | George-Svahn | G06F 3/0227 345/168 |
| 2016/0182877 A1 | 6/2016 | Deluca | |
| 2016/0262614 A1 | 9/2016 | Ninomiya et al. | |
| 2016/0295038 A1 | 10/2016 | Rao et al. | |
| 2016/0371888 A1 | 12/2016 | Wright et al. | |
| 2016/0379418 A1 | 12/2016 | Osborn et al. | |
| 2017/0060230 A1 | 3/2017 | Faaborg et al. | |
| 2017/0099481 A1 | 4/2017 | Held et al. | |
| 2017/0134553 A1 | 5/2017 | Jeon et al. | |
| 2017/0153701 A1 | 6/2017 | Mahon et al. | |
| 2017/0185276 A1 | 6/2017 | Lee et al. | |
| 2017/0194768 A1 | 7/2017 | Powers et al. | |
| 2017/0221276 A1 | 8/2017 | Osborn et al. | |
| 2017/0237974 A1 | 8/2017 | Samec et al. | |
| 2017/0318019 A1 | 11/2017 | Gordon et al. | |
| 2018/0004283 A1 | 1/2018 | Mathey-Owens et al. | |
| 2018/0054487 A1 | 2/2018 | Hebsur et al. | |
| 2018/0081171 A1 | 3/2018 | Park et al. | |
| 2018/0204385 A1 | 7/2018 | Sarangdhar et al. | |
| 2019/0025910 A1* | 1/2019 | Gilra | G06F 3/04842 |
| 2019/0122420 A1 | 4/2019 | Terahata | |
| 2019/0244416 A1 | 8/2019 | Tamaoki et al. | |
| 2019/0318660 A1* | 10/2019 | Kimoto | G09B 23/285 |
| 2020/0192622 A1 | 6/2020 | Stoyles et al. | |
| 2020/0201444 A1 | 6/2020 | Stoyles et al. | |
| 2020/0225746 A1 | 7/2020 | Bar-Zeev et al. | |
| 2020/0225747 A1 | 7/2020 | Bar-Zeev et al. | |
| 2020/0301553 A1 | 9/2020 | Taylor et al. | |

FOREIGN PATENT DOCUMENTS

| | | |
|---|---|---|
| CN | 106164818 A | 11/2016 |
| CN | 106415444 A | 2/2017 |
| CN | 106951069 A | 7/2017 |
| EP | 2940556 A1 | 11/2015 |
| EP | 3118722 A1 | 1/2017 |
| JP | 2015-126857 A | 7/2015 |
| JP | 2016-192132 A | 11/2016 |
| KR | 10-2007-0067332 A | 6/2007 |
| KR | 10-2015-0125472 A | 11/2015 |
| WO | 2013/144807 A1 | 10/2013 |
| WO | 2015/110852 A1 | 7/2015 |
| WO | 2017/031089 A1 | 2/2017 |

OTHER PUBLICATIONS

International Preliminary Report on Patentability received for PCT Patent Application No. PCT/US2018/053415, dated Apr. 9, 2020, 10 pages.
International Preliminary Report on Patentability received for PCT Patent Application No. PCT/US2018/053422, dated Apr. 9, 2020, 10 pages.
International Preliminary Report on Patentability received for PCT Patent Application No. PCT/US2018/053427, dated Apr. 9, 2020, 14 pages.
International Preliminary Report on Patentability received for PCT Patent Application No. PCT/US2018/053428, dated Apr. 9, 2020, 8 pages.
International Preliminary Report on Patentability received for PCT Patent Application No. PCT/US2019/028980, dated Nov. 19, 2020, 10 pages.
International Search Report and Written Opinion received for PCT Patent Application No. PCT/US2018/053415, dated Dec. 13, 2018, 14 pages.
International Search Report and Written Opinion received for PCT Patent Application No. PCT/US2018/053422, dated Dec. 19, 2018, 13 pages.
International Search Report and Written Opinion received for PCT Patent Application No. PCT/US2018/053427, dated Mar. 25, 2019, 18 pages.
International Search Report and Written Opinion received for PCT Patent Application No. PCT/US2018/053428, dated Jan. 25, 2019, 9 pages.
International Search Report and Written Opinion received for PCT Patent Application No. PCT/US2019/028980, dated Aug. 16, 2019, 14 pages.
Invitation to Pay Additional Fees received for PCT Patent Application No. PCT/US2018/053427, dated Feb. 1, 2019, 13 pages.
Non-Final Office Action received for U.S. Appl. No. 16/828,852, dated Nov. 9, 2020, 14 pages.
Final Office Action received for U.S. Appl. No. 16/802,188, dated May 14, 2021, 18 pages.
Notice of Allowance received for U.S. Appl. No. 16/802,320, dated Apr. 30, 2021, 9 pages.
Office Action received for European Patent Application No. 18786644.7, dated Apr. 28, 2021, 6 pages.
Applicant-Initiated Interview Summary received for U.S. Appl. No. 16/828,852, dated Jan. 27, 2021, 4 pages.
Applicant-Initiated Interview Summary received for U.S. Appl. No. 16/802,188, dated Mar. 23, 2021, 2 pages.
Final Office Action received for U.S. Appl. No. 16/828,852, dated Mar. 9, 2021, 16 pages.
Applicant-Initiated Interview Summary received for U.S. Appl. No. 16/802,320, dated Apr. 9, 2021, 2 pages.
Office Action received for Japanese Patent Application No. 2020-512573, dated Apr. 12, 2021, 7 pages (4 pages of English Translation and 3 pages of Official Copy).
Stellmach, et al., "Look & Touch: Gaze-supported Target Acquisition", CHI'12: Proceedings of the SIGGHI Conference on Human Factors in Computing Systems, Available online at: https://dl.acm.org/doi/10.1145/2207676.2208709, May 5-10, 2012, pp. 2981-2990.
Stellmach, et al., "Still Looking: Investigating Seamless Gaze-supported Selection, Positioning, and Manipulation of Distant Targets", CHI'13: Proceedings of the SIGCHI Conference on Human Factors in Computing Systems, Available online at: https://dl.acm.org/doi/10.1145/2470654.2470695, Apr. 2013, pp. 285-294.
Non-Final Office Action received for U.S. Appl. No. 16/802,188, dated Dec. 16, 2020, 15 pages.
Non-Final Office Action received for U.S. Appl. No. 16/802,320, dated Dec. 24, 2020, 19 pages.
Corrected Notice of Allowance received for U.S. Appl. No. 16/828,857, dated Sep. 1, 2021, 3 pages.
Office Action received for Chinese Patent Application No. 201880052303.4, dated Sep. 27, 2021, 20 pages (7 pages of English Translation and 13 pages of Official Copy).

(56) References Cited

OTHER PUBLICATIONS

Notice of Allowance received for U.S. Appl. No. 16/802,188, dated Jul. 29, 2021, 8 pages.
Notice of Allowance received for U.S. Appl. No. 16/828,852, dated Jul. 27, 2021, 10 pages.
Notice of Allowance received for U.S. Appl. No. 16/828,857, dated Jul. 14, 2021, 6 pages.
Applicant-Initiated Interview Summary received for U.S. Appl. No. 16/828,852, dated Jun. 8, 2021, 2 pages.
Applicant-Initiated Interview Summary received for U.S. Appl. No. 16/828,857, dated Jun. 10, 2021, 3 pages.
Office Action received for Chinese Patent Application No. 201880055893.6, dated Sep. 6, 2021, 21 pages (6 pages of English Translation and 15 pages of Official Copy).
Office Action received for Korean Patent Application No. 10-2020-7006018, dated Oct. 9, 2021, 9 pages (4 pages of English Translation and 5 pages of Official Copy).
Decision to Grant received for Japanese Patent Application No. 2020-512573, dated Aug. 2, 2021, 3 pages (1 page of English Translation and 2 pages of Official Copy).
Office Action received for Chinese Patent Application No. 201880051530.5, dated Sep. 6, 2021, 18 pages (6 pages of English Translation and 12 pages of Official Copy).

\* cited by examiner

SELECTING A TEXT INPUT FIELD USING EYE GAZE

CROSS REFERENCE TO RELATED APPLICATIONS

This application is a U.S. National Stage Patent Application of PCT/US2019/028980, filed Apr. 24, 2019, entitled "SELECTING A TEXT INPUT FIELD USING EYE GAZE", which claims priority to U.S. Provisional Application No. 62/669,290, filed May 9, 2018, entitled "SELECTING A TEXT INPUT FILED USING EYE GAZE", which are hereby incorporated by reference in their entireties for all purposes.

BACKGROUND

1. Field

The present disclosure relates generally to user interfaces for interacting with an electronic device, and more specifically to interacting with an electronic device using an eye gaze.

2. Description of Related Art

Conventional electronic devices use input mechanisms, such as keyboards, buttons, joysticks, and touch-screens, to receive inputs from a user. Some conventional devices also include a screen that displays content responsive to a user's input. Such input mechanisms and displays provide an interface for the user to interact with an electronic device.

BRIEF SUMMARY

The present disclosure describes techniques for interacting with an electronic device using an eye gaze. According to some embodiments, a user uses his or her eyes to select a text input field displayed on the electronic device. The techniques provide a more natural and efficient interface by, in some exemplary embodiments, allowing a user to identify where text is to be entered using primarily eye gazes. The techniques can be applied to conventional user interfaces on devices such as desktop computers, laptops, tablets, and smartphones. The techniques are also advantageous for virtual reality, augmented reality, and mixed reality devices and applications, as described in greater detail below.

According to some embodiments, a technique for selecting a text input field includes displaying, on one or more displays, a graphical object including the text input field, wherein the text input field is associated with one or more respective locations on the one or more displays; determining, using the one or more gaze sensors, one or more characteristics of an eye gaze; determining, using the one or more characteristics of the eye gaze, a gaze location; receiving input, from an input device, corresponding to one or more text characters; in accordance with a determination that the gaze location corresponds to the one or more respective locations, displaying the one or more text characters in the text input field; and in accordance with a determination that the gaze location does not correspond to the one or more respective locations, forgoing displaying the one or more text characters in the text input field.

In some embodiments, the one or more respective locations correspond to a first displayed location of the text input field on a first display and a second displayed location of the text input field on a second display. In some embodiments, the technique further includes, in accordance with the determination that the gaze location corresponds to the one or more respective locations, providing an indication that the gaze location corresponds to the one or more respective locations.

In some embodiments, the input device includes a speech-to-text engine and the received input is a natural language input provided to a microphone. In some embodiments, the input device is a keyboard. In some embodiments, the input device is a touch-sensitive surface.

In some embodiments, the technique further includes, displaying a second graphical object including a second text input field, wherein the second text input field is associated with one or more respective second locations on the one or more displays; and in accordance with a determination that the gaze location corresponds to the one or more respective second locations, displaying the one or more text characters in the second text input field.

In some embodiments, determining the gaze location includes determining, using the one or more characteristics of the eye gaze, that the eye gaze is directed at the gaze location for a first predetermined amount of time. In some embodiments, the technique further includes, maintaining the gaze location when the eye gaze is directed at another location for less than a second predetermined amount of time.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1A:
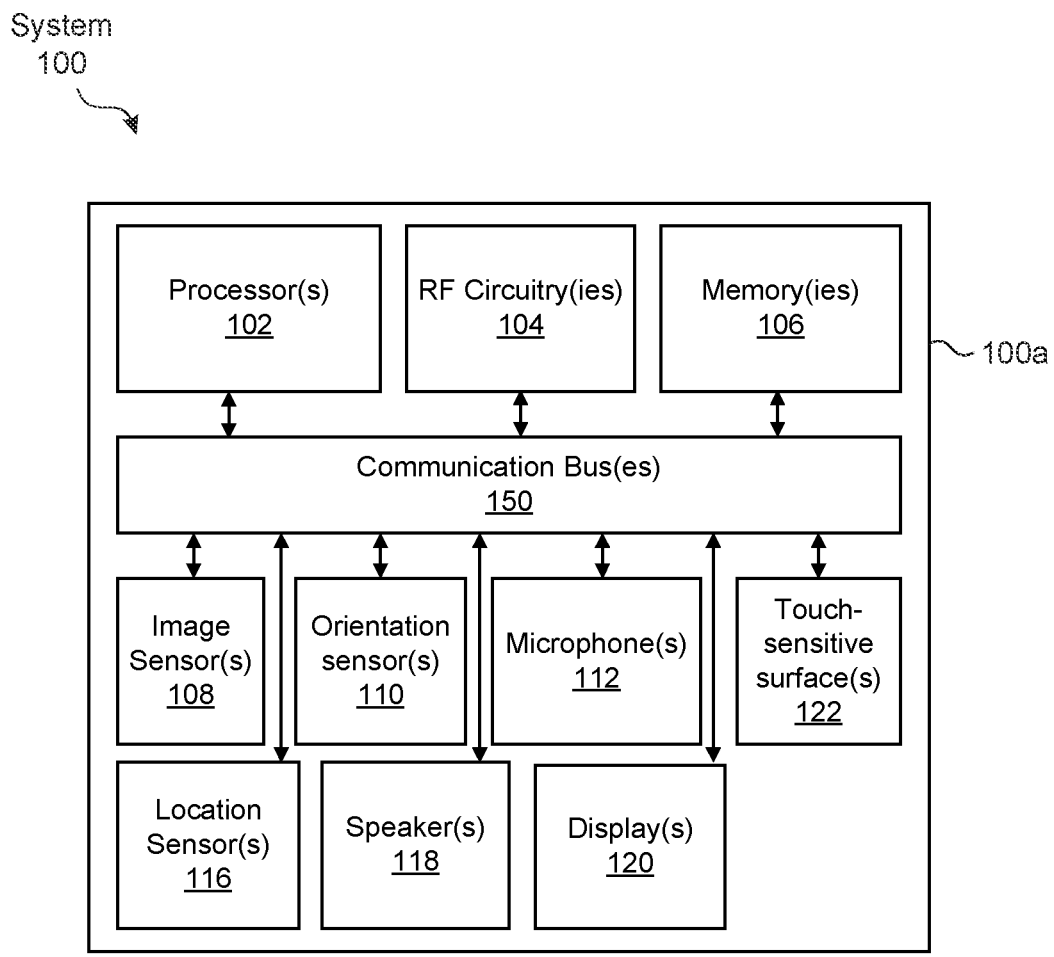
FIGS. 1A-1B depict exemplary systems for use in various computer-generated reality technologies, including virtual reality and mixed reality.

The following description sets forth exemplary methods, parameters, and the like. It should be recognized, however, that such description is not intended as a limitation on the scope of the present disclosure but is instead provided as a description of exemplary embodiments.

Various examples of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
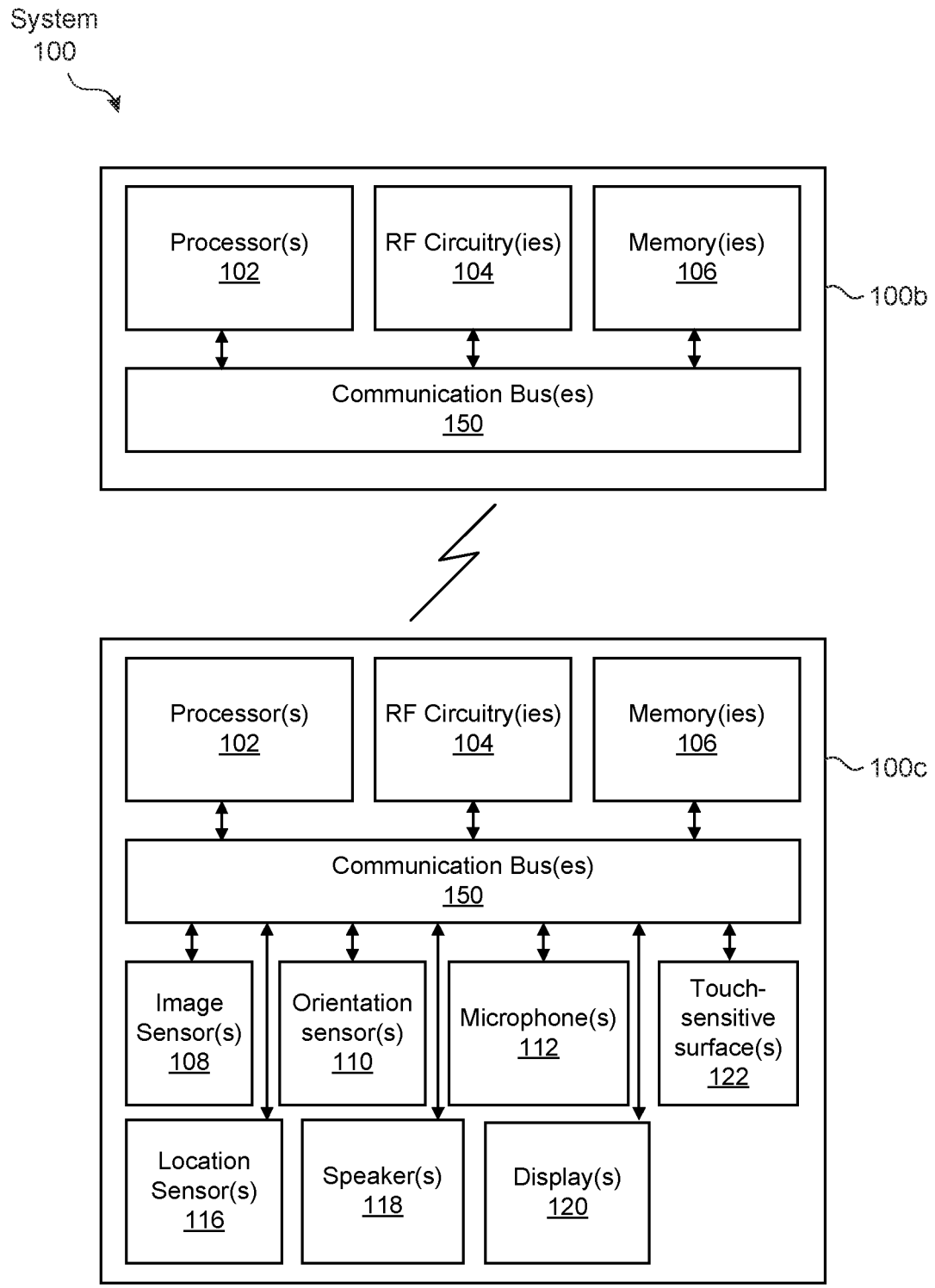

FIGS. 1A and 1B depict exemplary system 100 for use in various reality computer-generated technologies.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some embodiments, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some embodiments, system 100 is a mobile device. In some embodiments, system 100 is a head-mounted display (HMD) device. In some embodiments, system 100 is a wearable HUD device.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some embodiments, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some embodiments, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some embodiments, display(s) 120 and touch-sensitive surface(s) 122 form touch-sensitive display(s).

System 100 includes image sensor(s) 108. Image sensors(s) 108 optionally include one or more visible light image sensors, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some embodiments, system 100 uses CCD sensors, event cameras, and depth sensors in combination to detect the physical environment around system 100. In some embodiments, image sensor(s) 108 include a first image sensor and a second image sensor. The first image sensor and the second image sensor are optionally configured to capture images of physical objects in the real environment from two distinct perspectives. In some embodiments, system 100 uses image sensor(s) 108 to receive user inputs, such as hand gestures. In some embodiments, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some embodiments, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

With reference now to FIGS. 2, 3A-3D, and 4A-4B, exemplary techniques for selecting a text input field using an eye gaze are described.

Figure 2:
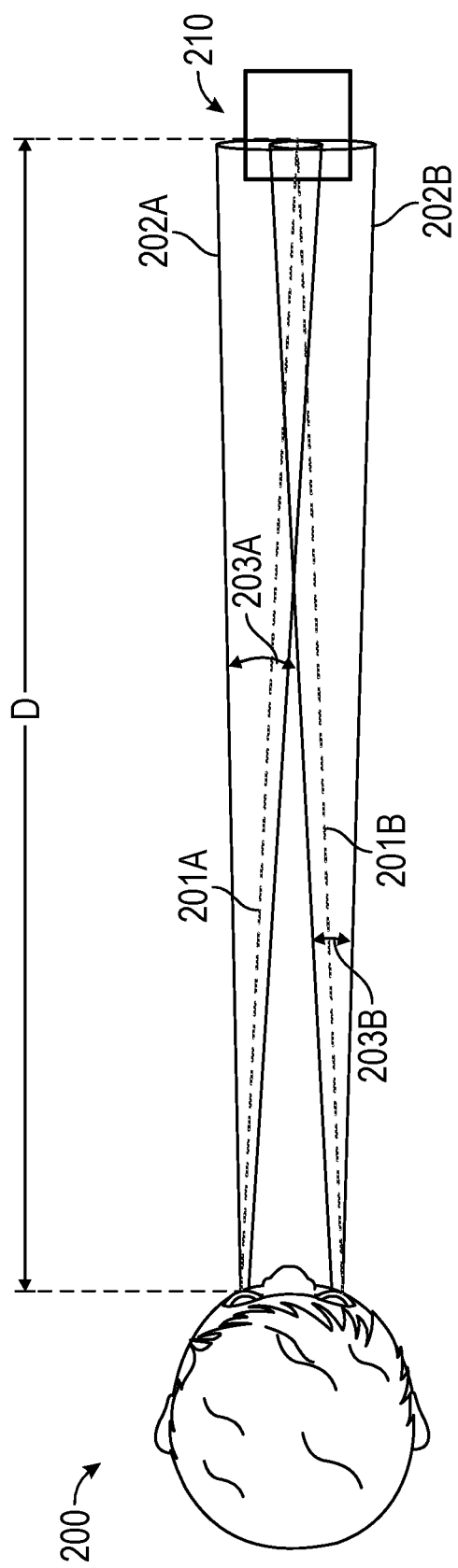
FIG. 2 illustrates a user viewing an object, according to various embodiments.

FIG. 2 depicts a top view of user 200 whose gaze is focused on object 210. The user's gaze is defined by the visual axes of each of the user's eyes (as depicted by rays 201A and 201B in FIG. 2). The direction of the visual axes define the user's gaze direction, and the distance at which the axes converge defines the gaze depth. The gaze direction can also be referred to as the gaze vector or line-of-sight. In FIG. 2, the gaze direction is in the direction of object 210 and the gaze depth is the distance D, relative to the user. The gaze direction and/or gaze depth are characteristics used to determine a gaze location (in this case, object 210) in some examples.

In some embodiments, the center of the user's cornea, the center of the user's pupil, and/or the center of rotation of the user's eyeball are determined to determine the position of the visual axis of the user's eye. Accordingly, the center of the user's cornea, the center of the user's pupil, and/or the center of rotation of the user's eyeball can be used to determine the user's gaze direction and/or gaze depth. In some embodiments, gaze depth is determined based on a point of convergence of the visual axes of the user's eyes (or a location of minimum distance between the visual axes of the user's eyes) or some other measurement of the focus of a user's eye(s). Optionally, the gaze depth is used to estimate the distance at which the user's eyes are focused.

In FIG. 2, rays 201A and 201B are cast (e.g., projected) along the visual axes of the left and right eyes of user 200, respectively, and are, optionally, used to determine the user's gaze direction and/or gaze depth in what is referred to as ray casting. FIG. 2 also depicts cones 202A and 202B having angular extents 203A and 203B, respectively. Cones 202A and 202B are also cast along the visual axes of the left and right eyes of user 200, respectively, and are optionally used to determine the user's gaze direction and/or gaze depth in what is referred to as cone casting.

FIGS. 3A-3D depict electronic device 300 with display 302. In some embodiments, electronic device 300 is an embodiment of system 100, as described in reference to FIGS. 1A-1B. In FIGS. 3A-3D, electronic device 300 is shown using a single display screen. However, it should be understood that electronic device 300 can be any device configured to display an interface.

Electronic device 300 displays interface 304, which includes graphical objects 306a, 306b, and 306c. In the illustrated embodiments, graphical objects 306a-c include respective text input fields with which a user can interact using an eye gaze. Spot 308 represents the eye gaze location of a user on display 302 (hereinafter referred to as gaze location 308). The gaze location 308 is determined based on characteristics of a user's eye gaze, such as gaze direction and/or gaze depth.

Figure 3A:
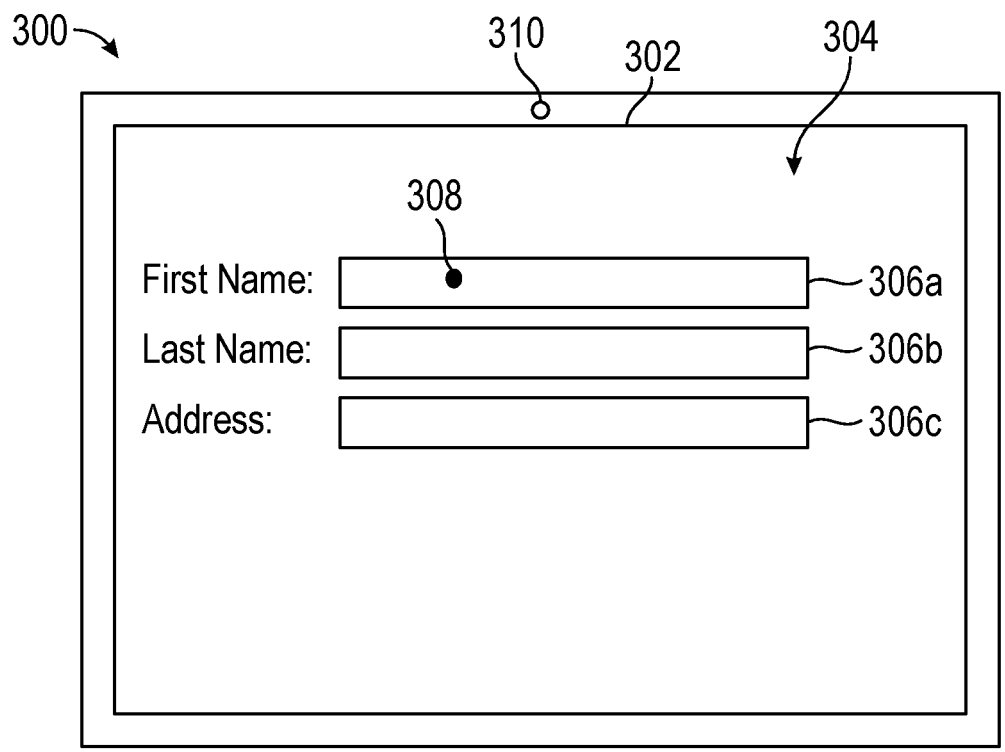
FIGS. 3A-3D illustrate an interface on a single display for selecting a text input field using an eye gaze, according to various embodiments.

As shown in FIG. 3A, the gaze location 308 corresponds to graphical object 306a. In some embodiments, electronic device 300 captures data from a gaze sensor 310 directed toward a user and determines gaze location 308 based on the data captured from the gaze sensor 310. In some embodiments in which interface 304 includes three-dimensional features, such as the embodiment described below with respect to FIGS. 4A-4B, electronic device 300 also (or alternatively) determines a gaze depth and whether the gaze depth corresponds to a graphical object 306a-c.

Gaze sensor 310 is directed toward a user and captures characteristics of the user's eye gaze, such as image data of the eyes of the user. In some embodiments, gaze sensor 310 includes an event camera that detects event data from a user (e.g., the user's eyes) based on changes in detected light intensity over time and uses the event data to determine gaze direction and/or gaze depth. Optionally, electronic device 300 uses both image data and event data to determine gaze direction and/or gaze depth. Optionally, electronic device 300 uses ray casting and/or cone casting to determine the gaze direction and/or gaze depth.

Based on characteristics of the eye gaze (e.g., gaze direction and/or gaze depth), electronic device 300 determines that the gaze location 308 corresponds to a location where graphical object 306a is being displayed (e.g., rays or cones cast from the eyes of the user at least partially intersect with a location on display 302 where graphical object 306a appears).

In some embodiments, gaze location 308 is determined to correspond to a graphical object 306a after the gaze location 308 no longer overlaps with the graphical object 306a (e.g., once the gaze location is initially determined to correspond to the graphical object 306a, the gaze location is considered to correspond to the graphical object 306a for at least a predetermined amount of time or for a predetermined amount of time after the user looks away from the graphical object 306a).

Figure 3B:
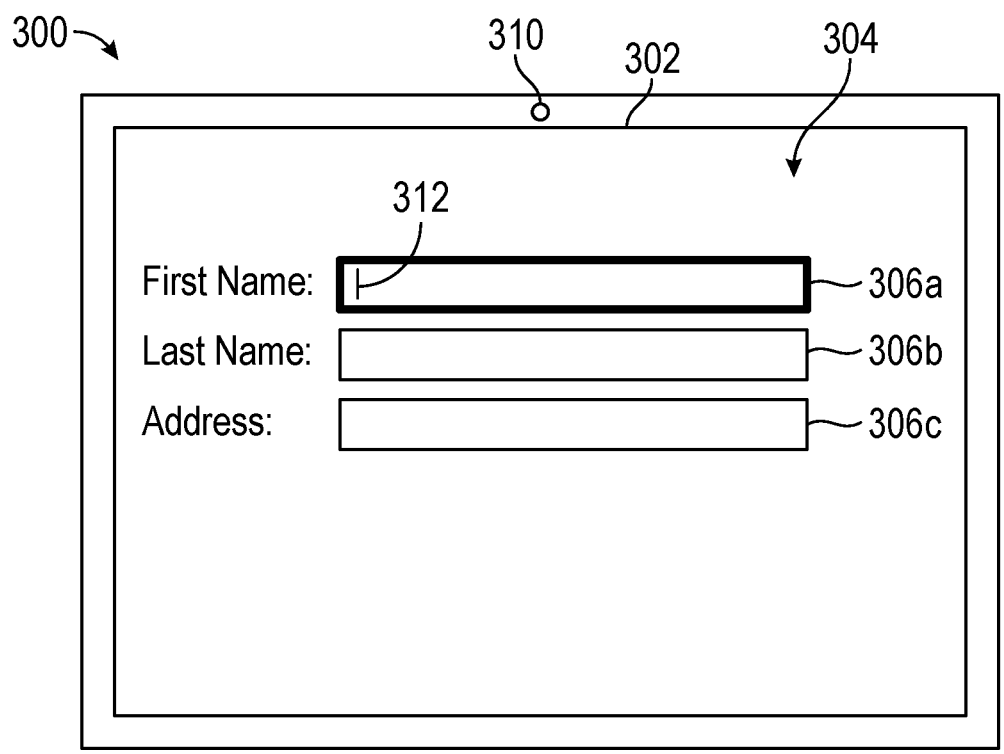

After determining that the gaze location 308 corresponds to graphical object 306a, graphical object 306a is selected, as shown in FIG. 3B. Optionally, an indication is displayed to indicate that graphical object 306a is selected. Examples of an indication include displaying a cursor 312 within graphical object 306a or highlighting a border area of graphical object 306a (e.g., displaying a border if no border was previously displayed, displaying a thicker border, or displaying a border in a different color). In some embodiments, the indication includes an audio output (e.g., a beep) or haptic output.

In some embodiments, graphical object 306a remains selected for a predetermined amount of time, even if the gaze location 308 no longer overlaps with the graphical object 306a. Optionally, graphical object 306a remains selected until an input associated with the graphical object 306a is received.

After graphical object 306a is selected, an input corresponding to one or more text characters is received from an input device. Examples of an input device include, but are not limited to, a keyboard, a touch-sensitive surface (e.g., track-pad or touchscreen), or a microphone. Depending on a type of the input device, the one or more text characters may correspond to letters typed on a keyboard, characters selected with a track-pad or touchscreen, or spoken words received by a microphone, respectively. When natural language (e.g., spoken) input is received with a microphone, a speech-to-text engine optionally translates (e.g., converts) the input into the one or more text characters.

Figure 3C:
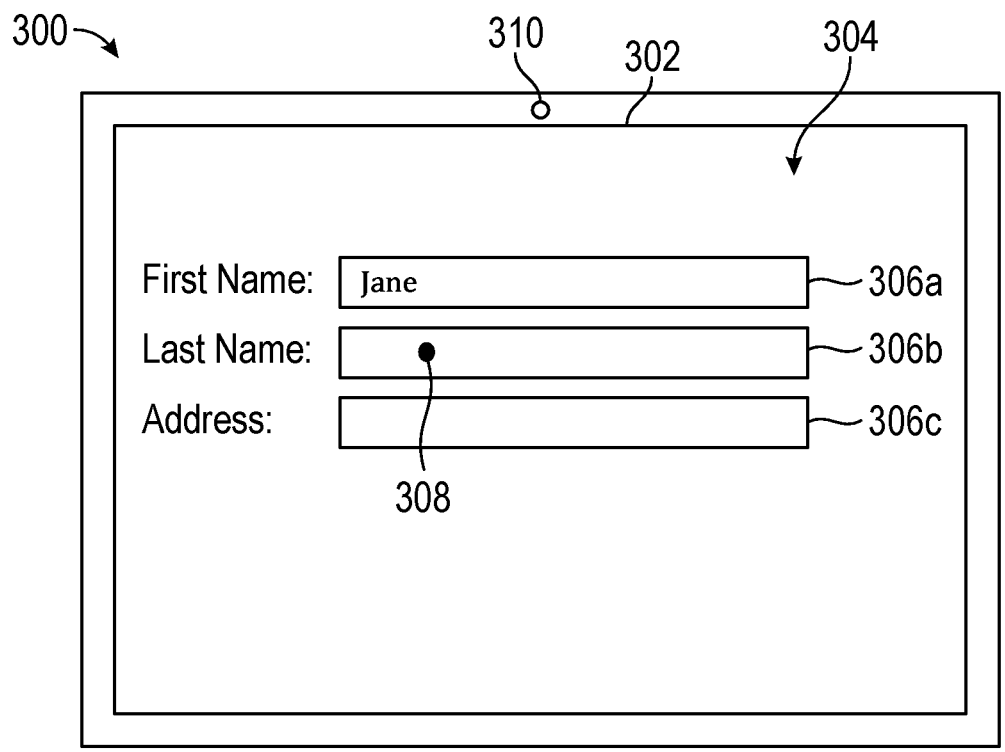

In some embodiments, the one or more text characters are displayed in the text input field of the selected graphical object 306a. For example, as shown in FIG. 3C, if input corresponding to the word "Jane" is received, then "Jane" is displayed in the text input field of graphical object 306a. By entering text characters into a text input field corresponding to a determined direction of the user's eye gaze, electronic device 300 provides a more efficient and natural interaction with the interface 304. For example, typical interfaces require a user to select a text input field with a mouse cursor or touch input, and then input text characters into the selected input field. Electronic device 300 allows a user to select a text input field by merely looking at the input field. Once electronic device 300 determines that the user's eye gaze is directed at a particular text input field (e.g., the text input field of graphical object 306a), received input will be displayed in that particular text input field.

In some embodiments, if input is received while the user's gaze location 308 does not correspond to a graphical object 306a-c, then electronic device 300 forgoes displaying the text characters corresponding to the input. Optionally, electronic device 300 provides a notification that no graphical object 306a-c is selected when the input is received.

After entering one or more text characters into the text input field of graphical object 306a, the gaze location 308 may move to graphical object 306b, as shown in FIG. 3C. Optionally, after gaze location 308 moves to graphical object 306b, graphical object 306a remains selected for a predetermined time. In this way, text characters can continue to be input into the text input field of graphical object 306a for a predetermined amount of time after the user looks away from graphical object 306a.

Figure 3D:
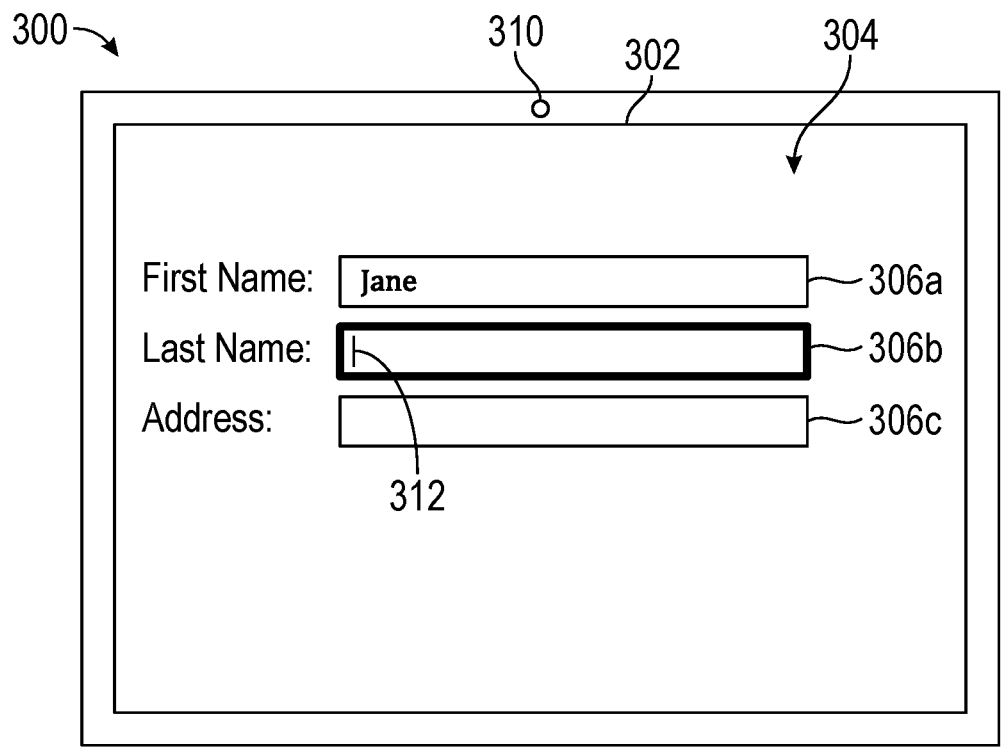

After determining that the gaze location 308 corresponds to graphical object 306b, graphical object 306b is selected, as shown in FIG. 3D. Optionally, an indication is displayed to indicate that graphical object 306b is selected, as described in reference to FIG. 3B. Further input can then be received and further text characters can be displayed in the text input field of graphical object 306b.

Figure 4A:
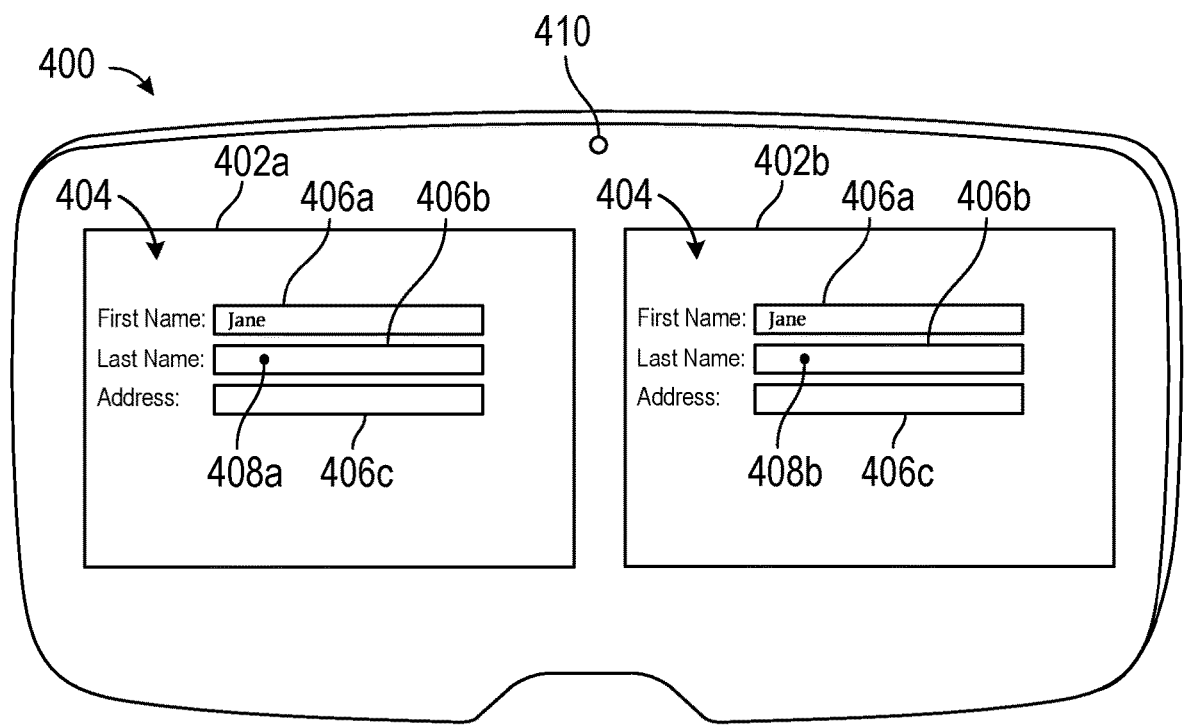
FIGS. 4A-4B illustrate an interface on dual displays for selecting a text input field using an eye gaze, according to various embodiments.
Figure 4B:
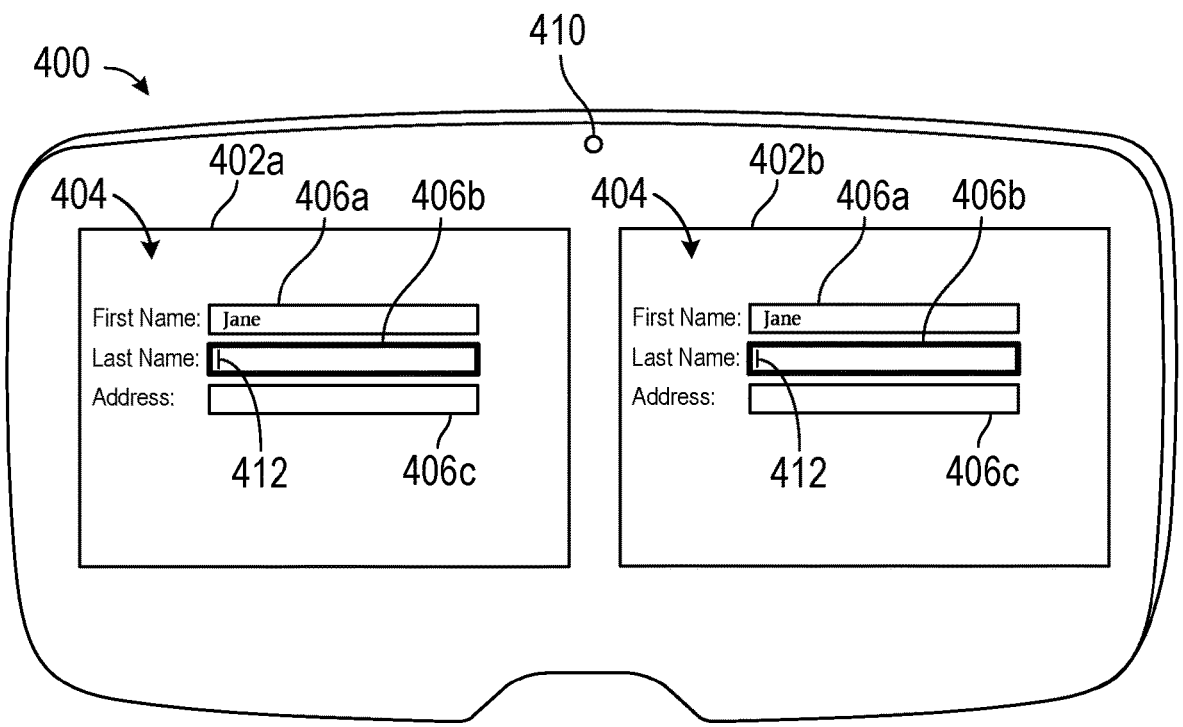

FIGS. 4A-4B depict electronic device 400 with dual displays 402a and 402b. In some embodiments, electronic device 400 is an embodiment of system 100, as described in reference to FIGS. 1A-1B. In FIGS. 4A-4B, electronic device 400 is shown as a head-mounted display device. However, it should be understood that electronic device 400 can be any device configured to display an interface.

Electronic device 400 displays interface 404 on dual displays 402a and 402b. Dual displays 402a and 402b can be physically separate displays or partitioned portions of a single display. Interface 404 includes graphical objects 406a, 406b, and 406c. Interface 404 is simultaneously displayed on dual displays 402a and 402b. Optionally, elements of interface 404, such as graphical objects 406a, 406b, and 406c, are displayed at different viewpoints on each display, resulting in a parallax effect that provides a user with the illusion of depth of the objects. In the illustrated embodiments, graphical objects 406a-c include text input fields with which a user can select using an eye gaze. Spots 408a and 408b represent the gaze locations of each of the user's eyes on respective displays 402a and 402b (hereinafter referred to as gaze locations 408a and 408b). The gaze locations 408a and 408b are determined based on characteristics of the user's eye gaze, such as gaze direction and/or gaze depth.

As shown in FIG. 4A, the gaze locations 408a and 408b correspond to graphical object 406a. By way of example, electronic device 400 captures data from one or more gaze sensors 410 directed toward the user and determines the gaze locations 408a and 408b based on the data captured from the gaze sensor 410. In some embodiments, electronic device 400 also (or alternatively) determines a gaze depth and whether the gaze depth corresponds to a graphical object 406a-c.

Gaze sensor 410 is directed toward a user and, during operation, captures characteristics of the user's eye gaze, such as image data of the eyes of the user. In some embodiments, gaze sensor 410 includes an event camera that detects event data from a user (e.g., the user's eyes) based on changes in detected light intensity over time and uses the event data to determine gaze direction and/or gaze depth. Optionally, electronic device 400 uses both image data and event data to determine gaze direction and/or gaze depth. Optionally, electronic device 400 uses ray casting and/or cone casting to determine the gaze direction and/or gaze depth. In some embodiments, multiple gaze sensors 410 are used.

Based on characteristics of the user's eye gaze (e.g., gaze direction and/or gaze depth), electronic device 400 determines that the gaze locations 408a and 408b correspond to locations on the dual displays 402a and 402b where a graphical object 406a-c is being displayed (e.g., rays or cones cast from the eyes of the user at least partially intersect with locations on displays 402a and 402b where a graphical object 406a-c appears).

After determining that gaze locations 408a and 408b correspond to a graphical object 406a-c, the corresponding graphical object 406a is selected and text characters are displayed, as described with reference to FIGS. 3A-3B. For example, as shown in FIG. 4A, if graphical object 406a is selected and input corresponding to the word "Jane" is received, then "Jane" is displayed in the text input field of graphical object 406a.

After entering one or more text characters into the text input field of graphical object 406a, the gaze locations 408a and 408b may move to graphical object 406b, as shown in FIG. 4A. After determining that gaze locations 408a and 408b correspond to graphical object 406b, graphical object 406b is selected, as shown in FIG. 4B. Optionally, an indication is displayed to indicate that graphical object 406b is selected. Examples of an indication include displaying a cursor 412 within graphical object 406b or highlighting a border area of graphical object 406b (e.g., displaying a border if no border was previously displayed, displaying a thicker border, or displaying a border in a different color). In some embodiments, the indication includes an audio output (e.g., a beep) or haptic output. Further input can then be received and further text characters can be displayed in the text input field of graphical object 406b.

Figure 5:
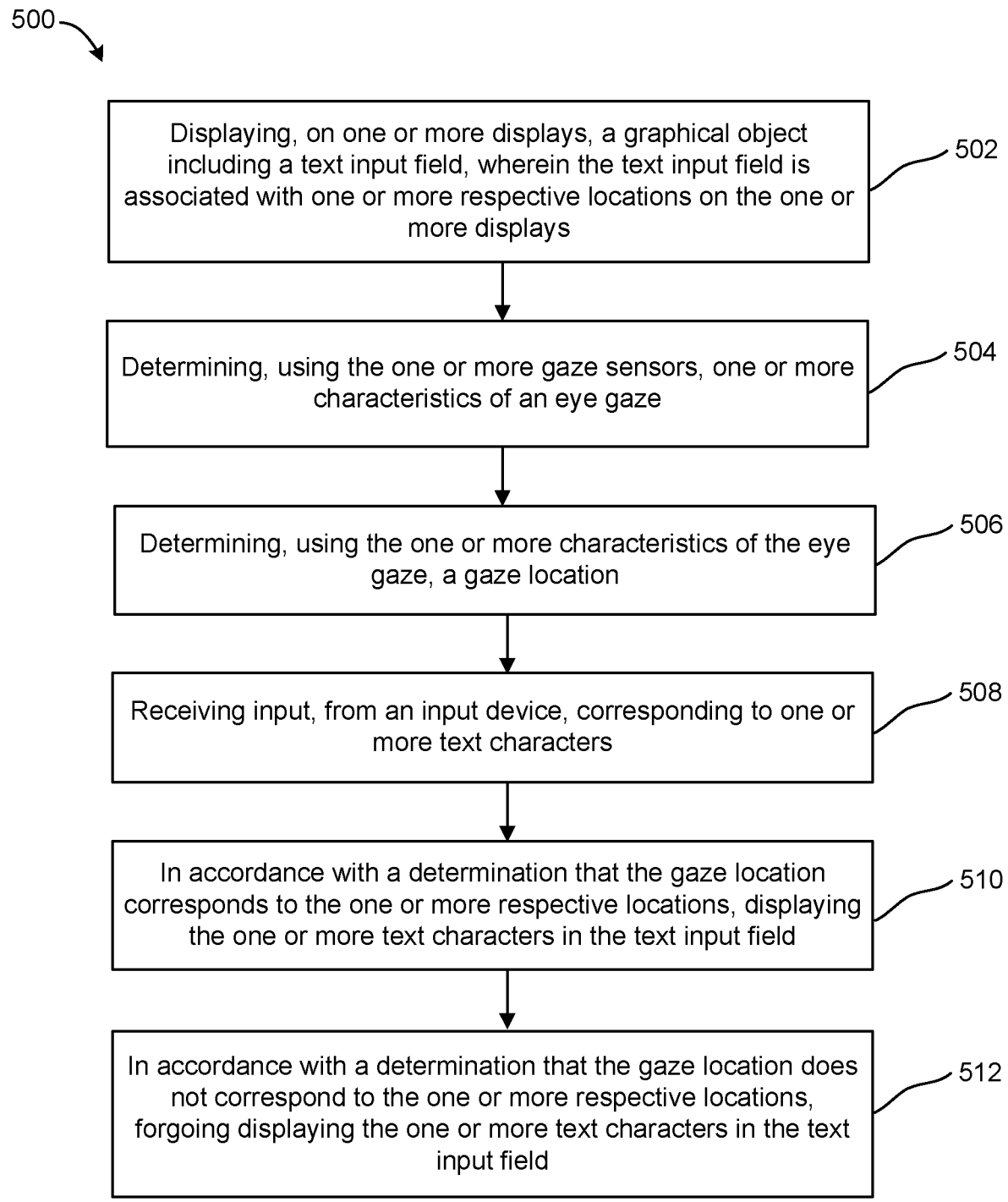
FIG. 5 depicts a flow chart of an exemplary process for selecting a text input field using an eye gaze, according to various embodiments.

Turning now to FIG. 5, a flow chart of exemplary process 500 for selecting a text input field using an eye gaze is depicted. Process 500 can be performed using a user device (e.g., 100a, 300, or 400). The user device is, for example, a desktop computer, a laptop computer, a handheld mobile device, a head-mounted display device, or a heads-up display device. It should be recognized that, in other embodiments, process 500 is performed using two or more electronic devices, such as a user device that is communicatively coupled to another device, such as a base device. In these embodiments, the operations of process 500 are distributed in any manner between the user device and the other device. Further, it should be appreciated that the display (or displays) of the user device can be transparent or opaque. It should also be appreciated that process 500 can be applied to CGR applications such as virtual reality, augmented reality, or mixed reality applications. Although the blocks of process 500 are depicted in a particular order in FIG. 5, it should be appreciated that these blocks can be performed in other orders. Further, one or more blocks of process 500 can be partially performed, optionally performed, combined with another block(s), and/or additional blocks can be performed.

At block 502, a graphical object (e.g., graphical object 306*a-c* or 406*a-c*) including a text input field is displayed on one or more displays. The text input field is associated with one or more respective locations on the one or more displays. In some embodiments, the one or more respective locations correspond to a first displayed location of the text input field on a first display and a second displayed location of the text input field on a second display.

At block 504, one or more characteristics of an eye gaze are determined using one or more gaze sensors (e.g., gaze sensor 310 or 410). In some embodiments, the characteristics of the eye gaze include gaze direction and/or the gaze depth. Optionally, the gaze direction or the gaze depth is determined using ray casting or cone casting.

At block 506, a gaze location (e.g., gaze location 308 or 408) is determined using the one or more characteristics of the eye gaze. In some embodiments, determining the gaze location includes determining, using the one or more characteristics of the eye gaze, that the eye gaze is directed at the gaze location for a first predetermined amount of time. In some embodiments, the gaze location is maintained when the eye gaze is directed at another location for less than a second predetermined amount of time.

At block 508, input corresponding to one or more text characters is received from an input device. In some embodiments, the input device includes a speech-to-text engine and the received input is a natural language (e.g., speech) input provided to a microphone. In some embodiments, the input device is a keyboard. In some embodiments, the input device is a touch-sensitive surface (e.g., a touch-pad or a touch-screen).

At block 510, in accordance with a determination that the gaze location corresponds to the one or more respective locations, the one or more text characters are displayed in the text input field. Optionally, an indication (e.g., cursor 312 or 412) is provided that the gaze location corresponds to the one or more respective locations.

At block 512, in accordance with a determination that the gaze location does not correspond to the one or more respective locations, the one or more text characters are not displayed in the text input field.

In some embodiments, a second text input field associated with one or more respective second locations is displayed on the one or more displays. When the gaze location corresponds to the one or more respective second locations, the one or more text characters are displayed in the second text input field.

Executable instructions for performing the features of method 500 described above are, optionally, included in a transitory or non-transitory computer-readable storage medium (e.g., memory(ies) 106) or other computer program product configured for execution by one or more processors (e.g., processor(s) 102).

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device, comprising:
one or more displays;
one or more gaze sensors;
one or more processors; and
memory storing one or more programs configured to be executed by the one or more processors, the one or more programs including instructions for:
displaying, on the one or more displays, a graphical object including a text input field, wherein the text input field is associated with one or more respective locations on the one or more displays;
determining, using the one or more gaze sensors, one or more characteristics of an eye gaze;
determining, using the one or more characteristics of the eye gaze, a gaze location;
receiving input, from an input device, corresponding to one or more text characters;
in accordance with a determination that the gaze location corresponds to the one or more respective locations, displaying the one or more text characters in the text input field; and
in accordance with a determination that the gaze location does not correspond to the one or more respective locations:
forgoing displaying the one or more text characters in the text input field; and
providing a notification that the gaze location does not correspond to the one or more respective locations when the input is received.

2. The electronic device of claim 1, wherein the one or more respective locations correspond to a first displayed location of the text input field on a first display and a second displayed location of the text input field on a second display.

3. The electronic device of claim 1, wherein the one or more programs further include instructions for:
in accordance with the determination that the gaze location corresponds to the one or more respective locations, providing an indication that the gaze location corresponds to the one or more respective locations.

4. The electronic device of claim 1, wherein the input device includes a speech-to-text engine and the received input is a natural language input provided to a microphone.

5. The electronic device of claim 1, wherein the input device is a keyboard.

6. The electronic device of claim 1, wherein the input device is a touch-sensitive surface.

7. The electronic device of claim 1, wherein the one or more programs further include instructions for:
displaying a second graphical object including a second text input field, wherein the second text input field is associated with one or more respective second locations on the one or more displays; and
in accordance with a determination that the gaze location corresponds to the one or more respective second locations, displaying the one or more text characters in the second text input field.

8. The electronic device of claim 1, wherein determining the gaze location includes determining, using the one or more characteristics of the eye gaze, that the eye gaze is directed at the gaze location for a first predetermined amount of time.

9. The electronic device of claim 1, wherein the one or more programs further include instructions for:
   maintaining the gaze location when the eye gaze is directed at another location for less than a second predetermined amount of time.

10. A non-transitory computer-readable storage medium storing one or more programs configured to be executed by one or more processors of an electronic device having one or more displays and one or more gaze sensors, the one or more programs including instructions for:
   displaying, on the one or more displays, a graphical object including a text input field, wherein the text input field is associated with one or more respective locations on the one or more displays;
   determining, using the one or more gaze sensors, one or more characteristics of an eye gaze;
   determining, using the one or more characteristics of the eye gaze, a gaze location;
   receiving input, from an input device, corresponding to one or more text characters;
   in accordance with a determination that the gaze location corresponds to the one or more respective locations, displaying the one or more text characters in the text input field; and
   in accordance with a determination that the gaze location does not correspond to the one or more respective locations:
      forgoing displaying the one or more text characters in the text input field; and
      providing a notification that the gaze location does not correspond to the one or more respective locations when the input is received.

11. The non-transitory computer-readable storage medium of claim 10, wherein the one or more respective locations correspond to a first displayed location of the text input field on a first display and a second displayed location of the text input field on a second display.

12. The non-transitory computer-readable storage medium of claim 10, wherein the one or more programs further include instructions for:
   in accordance with the determination that the gaze location corresponds to the one or more respective locations, providing an indication that the gaze location corresponds to the one or more respective locations.

13. The non-transitory computer-readable storage medium of claim 10, wherein the input device includes a speech-to-text engine and the received input is a natural language input provided to a microphone.

14. The non-transitory computer-readable storage medium of claim 10, wherein the input device is a keyboard.

15. The non-transitory computer-readable storage medium of claim 10, wherein the input device is a touch-sensitive surface.

16. The non-transitory computer-readable storage medium of claim 10, wherein the one or more programs further include instructions for:
   displaying a second graphical object including a second text input field, wherein the second text input field is associated with one or more respective second locations on the one or more displays; and
   in accordance with a determination that the gaze location corresponds to the one or more respective second locations, displaying the one or more text characters in the second text input field.

17. The non-transitory computer-readable storage medium of claim 10, wherein determining the gaze location includes determining, using the one or more characteristics of the eye gaze, that the eye gaze is directed at the gaze location for a first predetermined amount of time.

18. The non-transitory computer-readable storage medium of claim 10, wherein the one or more programs further include instructions for:
   maintaining the gaze location when the eye gaze is directed at another location for less than a second predetermined amount of time.

19. A method, comprising:
   at an electronic device with one or more gaze sensors and one or more displays:
      displaying, on the one or more displays, a graphical object including a text input field, wherein the text input field is associated with one or more respective locations on the one or more displays;
      determining, using the one or more gaze sensors, one or more characteristics of an eye gaze;
      determining, using the one or more characteristics of the eye gaze, a gaze location;
      receiving input, from an input device, corresponding to one or more text characters;
      in accordance with a determination that the gaze location corresponds to the one or more respective locations, displaying the one or more text characters in the text input field; and
      in accordance with a determination that the gaze location does not correspond to the one or more respective locations:
         forgoing displaying the one or more text characters in the text input field; and
         providing a notification that the gaze location does not correspond to the one or more respective locations when the input is received.

20. The method of claim 19, wherein the one or more respective locations correspond to a first displayed location of the text input field on a first display and a second displayed location of the text input field on a second display.

21. The method of claim 19, further comprising:
   in accordance with the determination that the gaze location corresponds to the one or more respective locations, providing an indication that the gaze location corresponds to the one or more respective locations.

22. The method of claim 19, wherein the input device includes a speech-to-text engine and the received input is a natural language input provided to a microphone.

23. The method of claim 19, wherein the input device is a keyboard.

24. The method of claim 19, wherein the input device is a touch-sensitive surface.

25. The method of claim 19, further comprising:
   displaying a second graphical object including a second text input field, wherein the second text input field is associated with one or more respective second locations on the one or more displays; and
   in accordance with a determination that the gaze location corresponds to the one or more respective second locations, displaying the one or more text characters in the second text input field.

26. The method of claim 19, wherein determining the gaze location includes determining, using the one or more characteristics of the eye gaze, that the eye gaze is directed at the gaze location for a first predetermined amount of time.

27. The method of claim 19, further comprising:
   maintaining the gaze location when the eye gaze is directed at another location for less than a second predetermined amount of time.

* * * * *